United States Patent

[11] 3,618,717

| | | |
|---|---|---|
| [72] | Inventor | Kermit V. Anderson<br>Delano, Minn. |
| [21] | Appl. No. | 837,211 |
| [22] | Filed | June 27, 1969 |
| [23] | | Division of Ser. No. 653,435, July 14, 1967,<br>Pat. No. 3,479,116. |
| [45] | Patented | Nov. 9, 1971 |
| [73] | Assignee | Washington Scientific Industires, Inc.<br>Minnetonka, Minn. |

[54] SPRING APPLIED, MECHANICAL RELEASED BRAKE
11 Claims, 9 Drawing Figs.

[52] U.S. Cl. .................................................. 188/166,
188/74
[51] Int. Cl. ...................................................... B60t 13/04
[50] Field of Search ........................................ 188/74,
166, 85, 105, 106 R

[56] References Cited
UNITED STATES PATENTS
2,782,263  2/1957  Hoehn et al. ................. 188/166 UX
3,233,706  2/1966  Laa et al. ....................... 188/166 X
FOREIGN PATENTS
504,320  4/1939  Great Britain ................. 188/166

Primary Examiner—George E. A. Halvosa
Attorney—Burd, Braddock & Bartz

ABSTRACT: A portable film reader having a light source directing light through a lens system and film onto a mirror used to reflect the light onto a rear projection screen. The reader is mounted on a frame located in the bottom of a carrying case. Parallel linkage connect the mirror with the cover of the carrying case so that the mirror moves up and down with the cover. The screen pivotally attached to the frame has folding side shields which cooperate with the cover to enclose the space between the mirror and screen eliminating outside light on the rear of the screen. The cover projects forward from the screen to function as a light visor. In the storage position the screen and side shields fold down adjacent the frame and the mirror moves down into the case with the closing of the cover.

Spring applied cam release brakes are used to simultaneously brake the spindles carrying the film reels. A common control rod carries separate springs to apply pivoted brake levers. A lever pivoted on the frame and connected to the control rod is selectively moved by a cam and finger to release the brakes. The cam is connected to a dual switch operable to selectively control motors for driving the spindles.

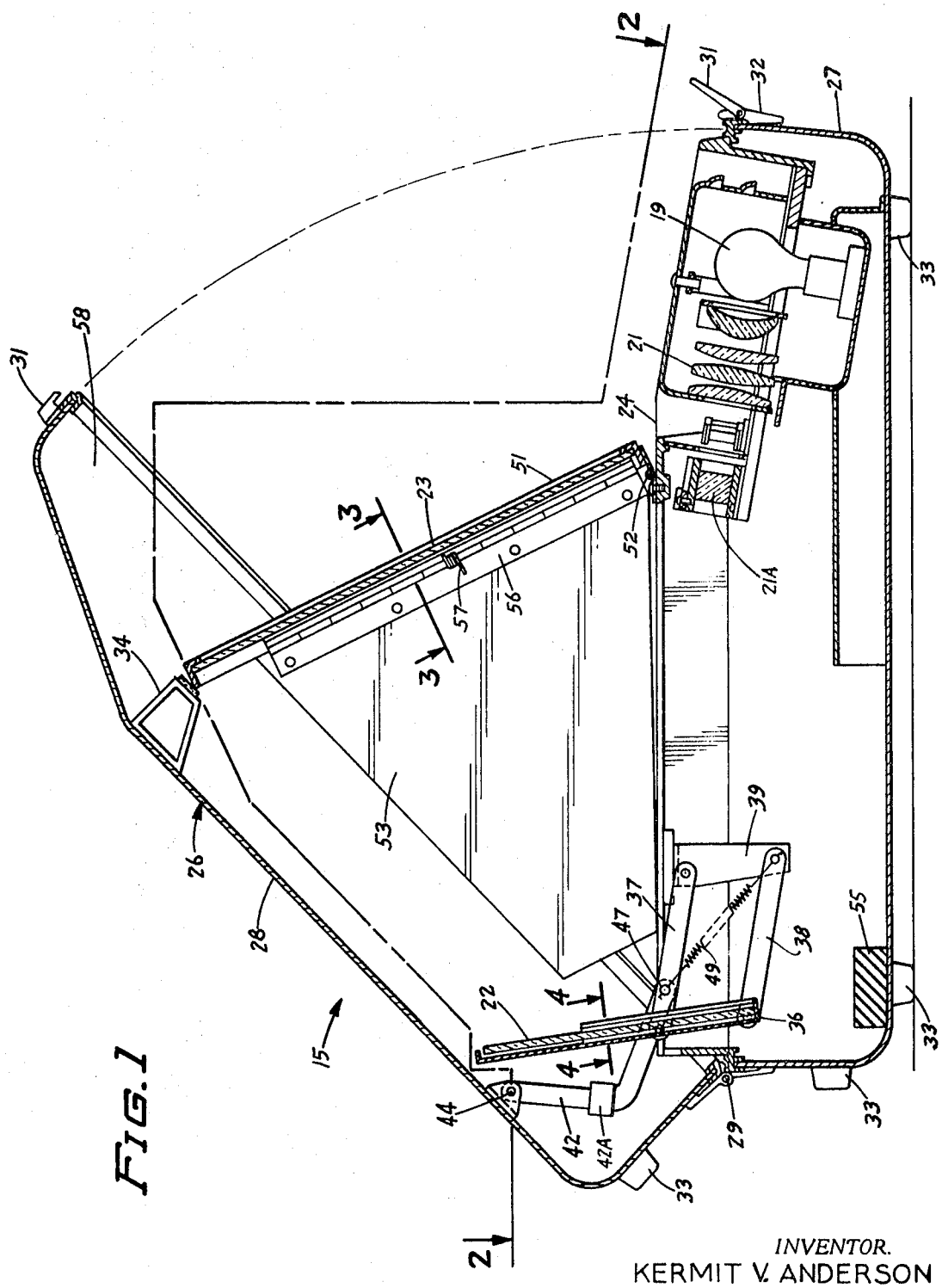

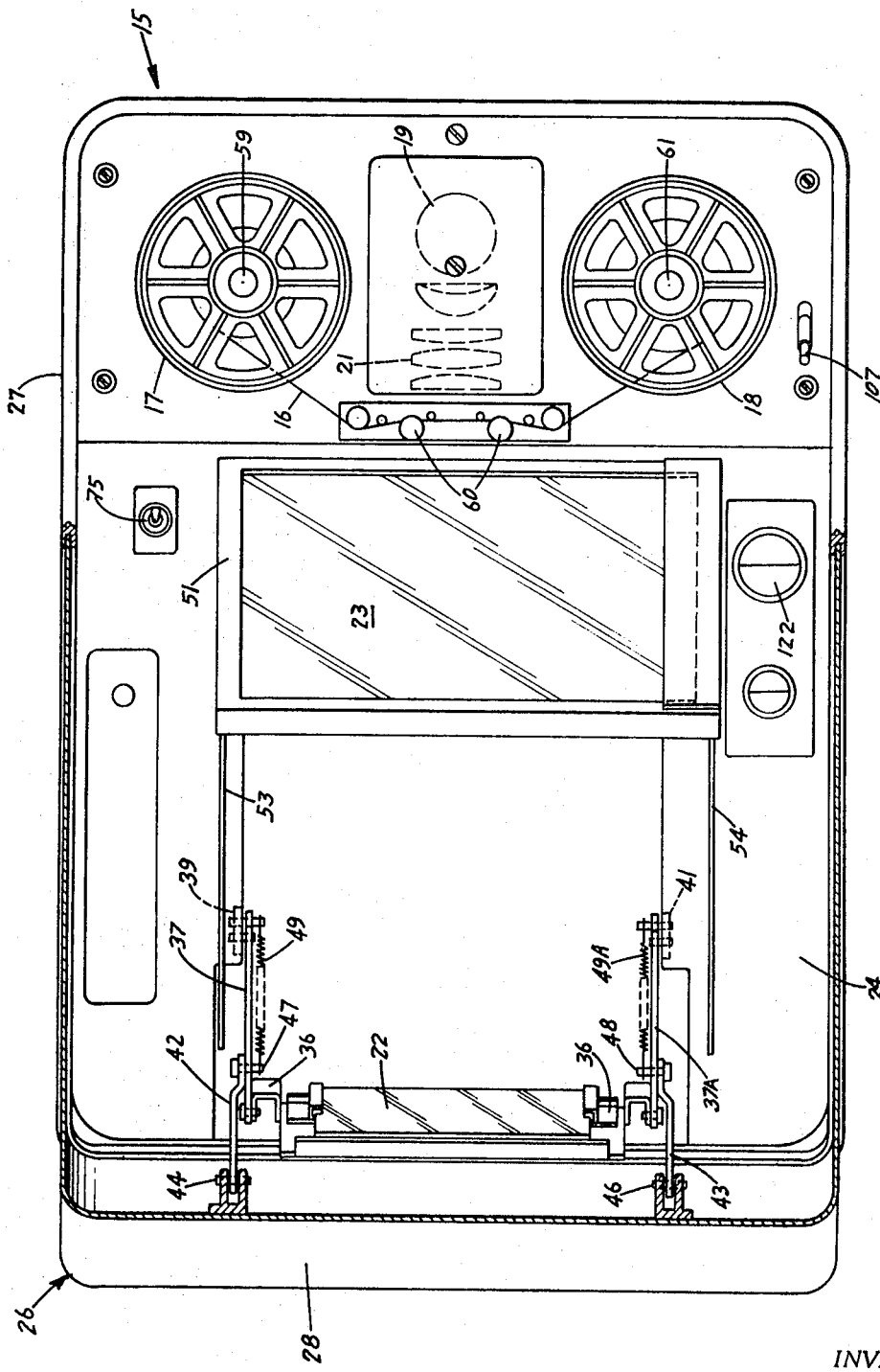

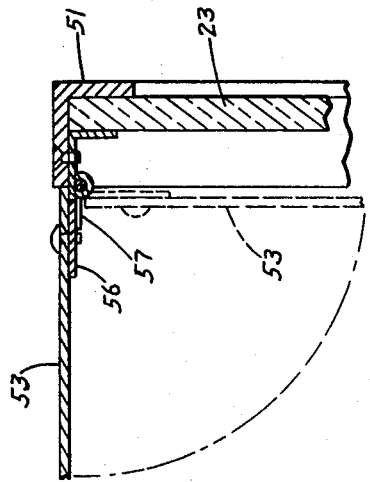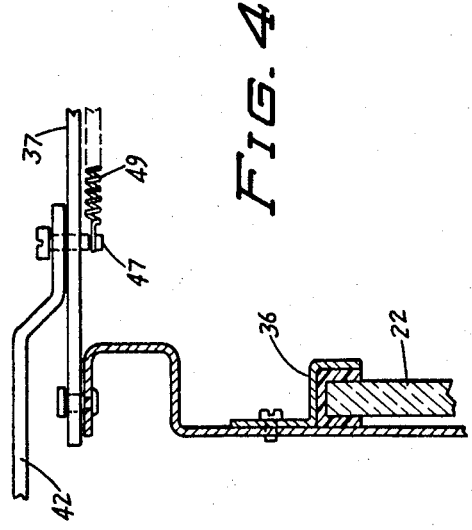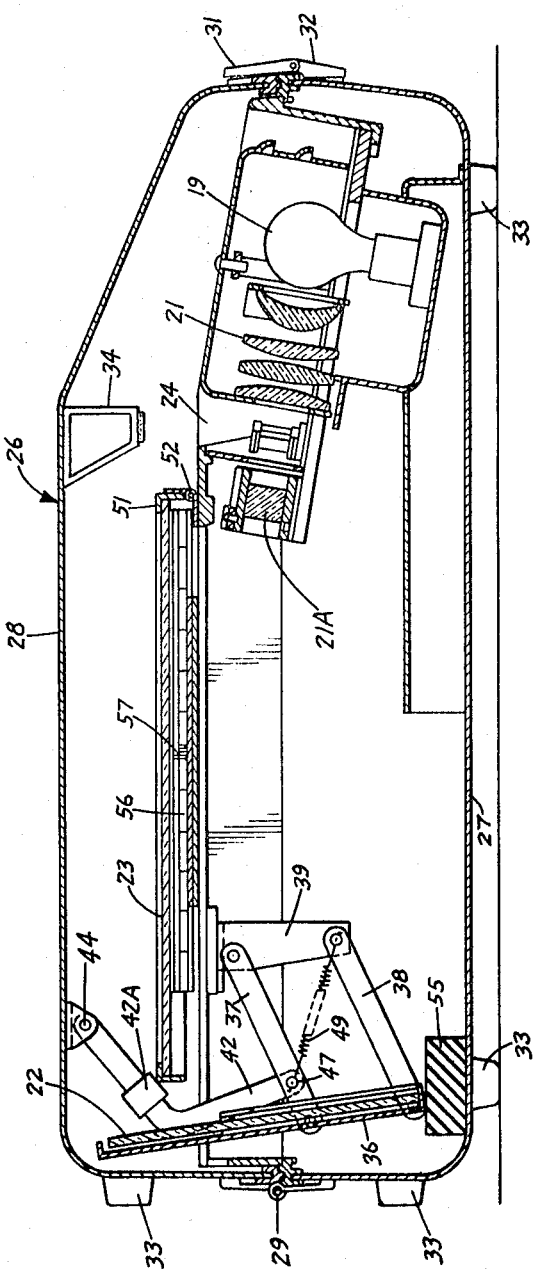
INVENTOR.
KERMIT V. ANDERSON

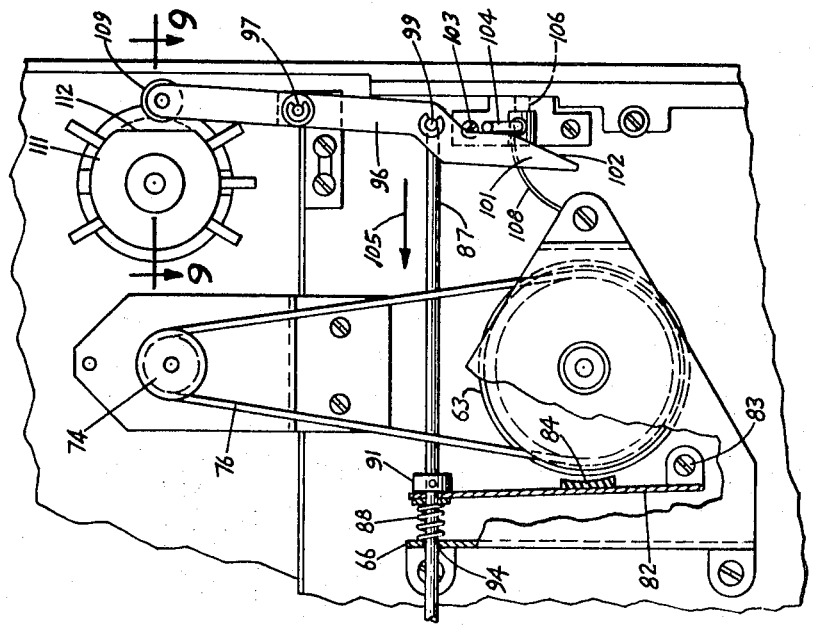
Fig. 8
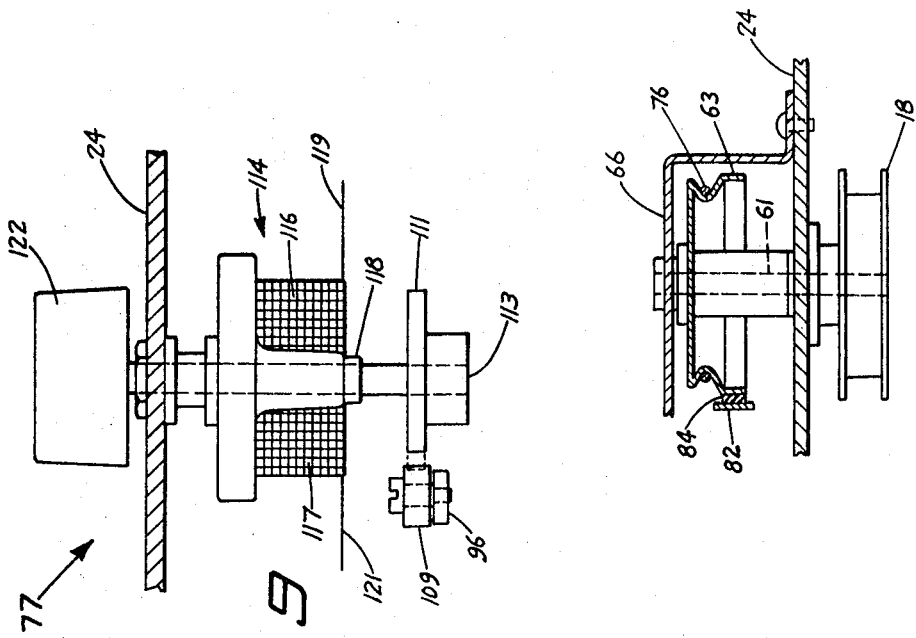
Fig. 7
Fig. 9
INVENTOR.
KERMIT V. ANDERSON

SPRING APPLIED, MECHANICAL RELEASED BRAKE

CROSS-REFERENCE TO RELATED APPLICATION

This application is a division of U.S. Pat. application Ser. No. 653,435, filed July 14, 1967 now U.S. Pat. No. 3,479,116.

SUMMARY OF INVENTION

The invention is directed to a brake for a rotatable means, as spindles for film reels of film viewer. The brake has release means including a lever connected to an arm means engageable with the rotatable means to brake the same. First and second means act on the lever to release the brake. The second means renders the first means inoperative when the arm means is in the brake release position.

IN THE DRAWINGS

FIG. 1 is a side elevational view in section of the film reader of the invention with the projection screen in the viewing position;

FIG. 2 is a sectional view taken along the line 2—2 of FIG. 1;

FIG. 3 is a sectional view taken along the line 3—3 of FIG. 1;

FIG. 4 is a sectional view taken along the line 4—4 of FIG. 1;

FIG. 5 is a view similar to FIG. 1 showing the projection screen folded and the cover closed;

FIG. 7 is a sectional view taken along the line 7—7 of FIG. 6;

Figure 6:
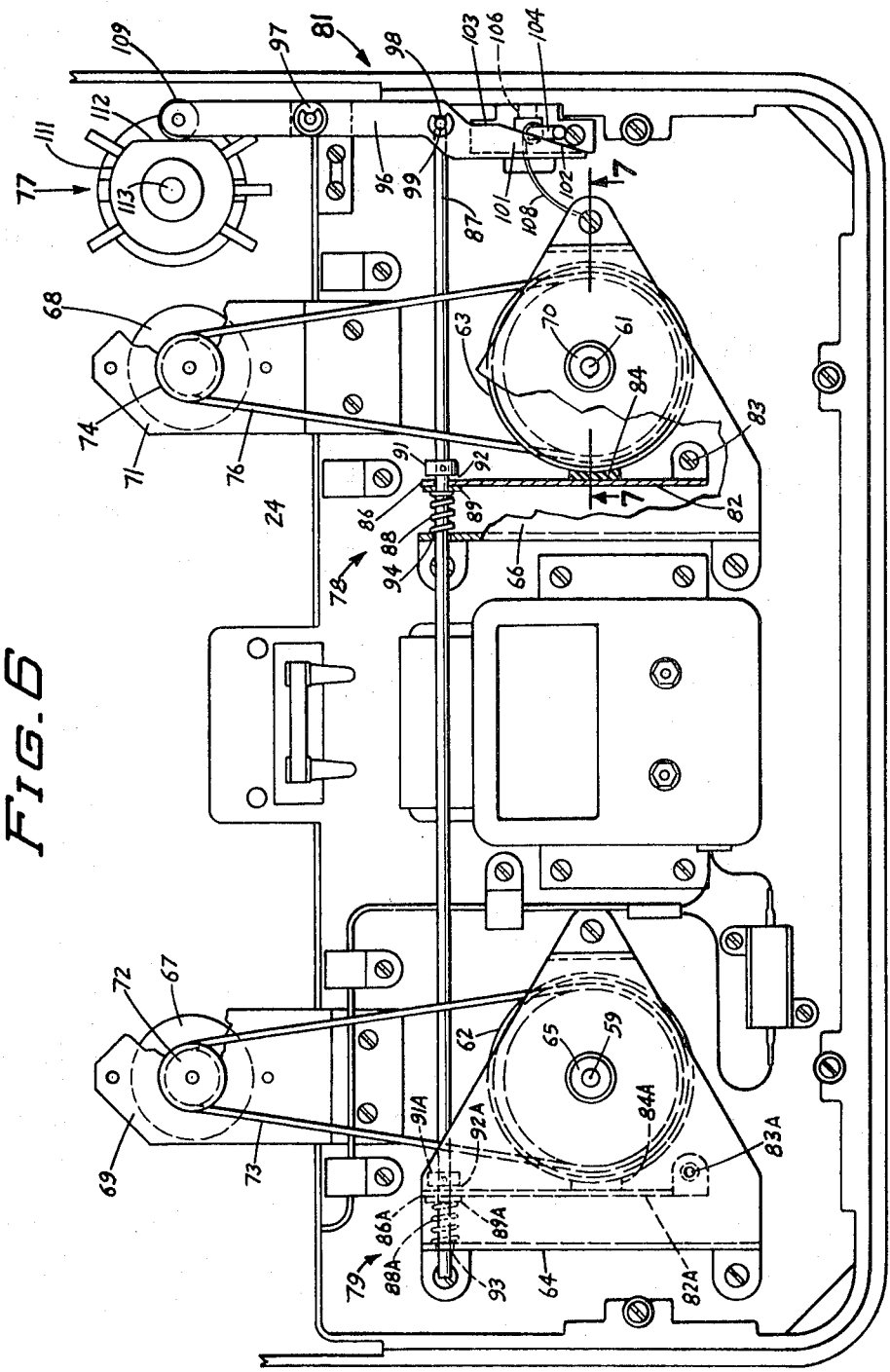
FIG. 6 is a bottom plan view of the drive and brake system for the film reels.

FIG. 8 is a partial plan view of the drive and brake system showing the brake in the release position; and FIG. 9 is an enlarged sectional view taken along line 9—9 of FIG. 8. Referring to the drawings, there is shown in FIGS. 1 and 2 the film reader of the invention indicated generally at 15. As shown in FIG. 2, reader 15 is designed for strip or tape film 16 carried on reels 17 and 18. A light source 19 projected through a light condensing system 21 and lens system 21A directs the image on the film to a mirror 22 which reflects the image onto a rear projection screen 23. Preferably the screen is lumenized, nonglare and tinted rear projection screen. Broadly, reader 15 is a combination projector and viewing screen.

The projection screen and mirror are carried on a frame 24 located in a carrying case indicated generally at 26. The midsection of frame 24 has a rectangular opening for the mirror and provides space between the mirror and the lens system for the light beam. The case is designed to fold into a luggage style carrying case to enhance the portability of the reader. Case 26 has a pan-shaped base 27 with a flat bottom wall and upright sidewalls carrying frame 24. Located over base 27 is a inverted pan-shaped cover 28. Hinges 29, located along the back of the base and cover, pivotally connect the cover to the base. Cooperating latches 31 secured to the front of the cover and the base are used to lock the case as shown in FIG. 5. A handle 32 attached to the front of base 27 facilitates the carrying of the case. Short leg or cushion members 33 are secured to the bottom and back of the base 27 and the back of cover 28 to stabilize the reader on a supporting surface.

As shown in FIGS. 1 and 2, cover 28 is held in an open position by the projection screen 23 which extends in an upwardly and rearwardly direction. Mirror 22 is in alignment with lens system 21A so that the light image is reflected by the mirror onto the projection screen 23. When cover 28 is in the open position, a stop 34 secured to the inside of the cover engages the top of the projection screen 23 holding the cover in a fixed position and stabilizes the projection screen.

As shown in FIGS. 1, 2, 4 and 5, mirror 22 is held in a frame 36 positioning the mirror in the rear area of the case in a generally upright position. Two pairs of forwardly extended parallel links 37 and 38 and 37A and 38B mount the mirror 22 on a pair of downwardly extended legs 39 and 41 secured to frame 24. A pair of links are located on opposite sides of the mirror with the rear portions of each link pivotally connected to frame 36 and the forward portions of each link pivotally connected to legs 39 and 41 respectively. The mirror 22 moves between an operative viewing position, shown in FIG. 1, and a storage position, shown in FIG. 5. Movement of mirror 22 is concurrent with and in response to the opening and closing of cover 28. Cover 28 dictates the position of mirror 22. This concurrent movement is achieved through the use of a pair of angularly shaped arms 42 and 43. The lower ends of the arms 42 and 43 are pivotally connected to intermediate portions of the top links 37 and 37A by pivots 47 and 48. The upper ends of each of the arms are connected through pivotal connections 46 and 47 to the cover 28, so that on angular movement of cover 28, parallel links 37 and 38 and 37A and 38A directly moving the mirror in generally up and down directions. Springs 49 and 49A connected to the pivots 47 and 48 and the lower pivots of arms 39 and 41 bias mirror 22 in a downward direction.

Referring to FIG. 1, 2 and 3, projection screen 23 is surrounded with a peripheral frame 51 used to mount the screen on frame 24. An elongated transverse hinge 52 secures the bottom of frame 51 to the main frame 24 permitting the swinging of frame 51 and projection screen 23 to an upright viewing position shown in FIG. 1 and to a flat folded storage position shown in FIG. 5.

To insure maximum light intensity and an even viewing image on screen 23, the sides of the screen as well as the space between the screen and mirror 22 is shielded with upright side walls 53 and 54 pivotally attached to opposite sides of frame 51 by upright hinges 56. Hinges 56 permit the sidewalls 53 and 54 to be folded into overlapped positions as shown in FIGS. 3 and 5. This allows both the sidewalls and the screen and frame to be moved to the folded storage position. A pair of torsion springs 57 cooperate with the hinge to bias the sidewalls to their extended positions. The springs also facilitate the opening as well as holding the sidewalls in their upright and rearwardly projected positions. Referring to FIG. 1, there is shown the sidewall 53 having a general rectangular shape and extending upwardly above the bottom edge of cover 28 with the bottom of the sidewall resting on frame 24. With the sidewall in this position the side light is eliminated. In addition, the sidewalls 53 and 54 function as supports for retaining the projection screen 23 in the upright read position. To reduce the intensity of the outside light and the glare on the front of the projection screen 23 cover 28 has a forward extension or visor 58 above and projected forwardly from the screen. The cover 28 in combination with the sidewalls is a light shield for both the front and backsides of the projection screen 23 providing maximum image intensity as well as uniform light intensity over the entire screen.

In use, reader 15 being portable is easily set up on a desk or a table making visual data immediately available where and when it is needed. The light emanating from light source 19 is directed through the light-condensing system 21 and film 16 then through lens 21A reflecting the image off mirror 22 onto the rear projection screen 23. Mirror 22 is held in position by cover 28 resting on the top of screen frame 51. Arms 42 and 43 pivotally attached to the cover directly move the parallel linkages supporting the mirror 22 with the movement of the cover so that the position of the mirror is dependent on the position of the cover. Separate adjustments and separate setting up of the mirror is not necessary to condition the reader for viewing.

On movement of projection screen 23 to its upright read position, as shown in FIG. 1, the sidewalls 53 and 54 are moved outwardly to their rearwardly extended positions. The side wall in conjunction with the cover shields the back or rear side of the screen from outside light. The inside of cover 28 and the sidewall 53 and 54 are dull black so that there is a minimum of reflected light to interfere with the image on screen 23.

Reader 15 is quickly converted to its storage position, shown in FIG. 5, by moving cover 28 upwardly to release stop 34 from the top of the screen frame 51. Sidewalls 53 and 54 are then folded over each other adjacent the inside surface of screen 23 so that both the sidewalls and the screen can be pivoted downwardly against the top of frame 24. The cover is then free to move to the closed position automatically carrying mirror 22 to the down position into engagement with mirror support block 55. Bumpers 42A on arms 42 engage screen frame 51 holding the screen against frame 24.

From the foregoing description it is readily apparent that the reader is a compact and portable machine that is quickly set up for reading data from films such as a taped film.

Referring to FIG. 2, reels 17 and 18 are mounted on upright rotatable spindles 59 and 61 located on opposite sides of the light condensing system 21. The portion of the film 16 between the reels is threaded through a film guide system 60 positioning the tape in alignment with the lens system 21A. Spindles 59 and 61 are mounted in bearings (not shown) carried on frame 24.

As shown in FIG. 6, the lower ends of the spindles 59 and 61 are secured to pulleys 62 and 63 respectively. A support 64 extends over pulley 62 and has a bearing 65 accommodating the lower end of spindle 59. A similar support 66 extends over pulley 63. A bearing 70 is mounted in support 66 rotatably mounts the lower end of spindle 61. Small electric DC motors 67 and 68 mounted on brackets 69 and 71 respectively are selectively operable to drive pulleys 62 and 63. Motor 67 has a drive pulley 72 connected by a belt 73 to the spindle pulley 62. In a similar manner, motor 68 has a drive pulley 74 connected by a belt 76 to the spindle pulley 63.

The motors 67 and 68 are selectively connected to a source of power by combination break and switch assembly indicated generally at 77. The assembly 77 has a pair of variable resistance switches and a single movable contact so that only one of the switches can be actuated at one time whereby only one of the motors is operating at one time to move that film in a forward or rearward direction. Operation of the other motor will move the film in the opposite direction. The motors 67 and 68 are small direct current motors enabling the spindles to be operated at varying speeds through the use of variable resistors switches. The reader being a portable machine including a transformer (not shown) enabling the reader to be connected to the conventional AC source of power. An on-off switch 75 shown in FIG. 2 is located in the electrical circuit for the reader.

The on and off positions of the switches of assembly 77 is coordinated with the operation of a pair of brakes 78 and 79 for the spindles 61 and 59 respectively. A common control mechanism indicated generally at 81 is used to release both brakes 78 and 79.

Brakes 78 and 79 are identical in structure and operation. The following description is limited to brake 78 with corresponding parts of brake 79 having the same reference numeral with the suffix A. As shown in FIG. 6, brake 78 has a lever 82 located adjacent one side of the pulley 63. Pivots 83 mount one end of lever 82 to support 66 and frame 24 so that the midportion of the lever moves toward and away from the pulley 63. A brake shoe 84 attached to the midsection of lever 82 is engageable with the pulley 63.

As shown in FIG. 7, pulley 63 has a downwardly extended flange providing an external braking surface or drum for the brakeshoe 84. Immediately above the flange pulley 63 has a circumferential groove accommodating the belt 76.

The free or opposite end 86 of lever 82 is bifurcated with an elongated transverse control rod 87 extended through the slot in end 86 of lever 82. A coil spring 88 located between support 66 and lever 82 positioned about rod 87 biases lever 82 toward the pulley 63 to the brake-applying position. A washer 89 interposed between the spring and the lever provides a seat for the spring 88. A collar or stop 91 is secured to the shaft on the side of the lever 82 opposite spring 88. Collar 91 is spaced a small distance from the lever 82 when the brake is applied so as not to interfere with the biasing action of spring 88. To release the brake control rod 87 is moved to the left as shown in FIG. 8 forcing the collar engagement with the end of lever 82 thereby moving the lever 82 away from the pulley 63 to a brake release position. In the release position shoe 84 is spaced from pulley 63.

The control rod 87 is mounted for sliding longitudinal movement in the supports 64 and 66 which have aligned holes 93 and 94 respectively for accommodating the rod 87. Control mechanism 81 attached to the right end of rod 87 is operable to move the rod in a direction to simultaneously release both brake 78 and 79.

Control mechanism 81 comprises a lever 96 pivoted to the frame at pivot connection 97. Lever 96 extends generally transverse to the direction of rod 87 and has a hole 98 receiving the turned end 99 of rod 87 thereby pivotally connecting the rod to the lever. The lever 96 extends forwardly from the pivot connection 97 and has a forward projection 101 with a forwardly and inwardly inclining edge 102 joined with a longitudinal straight edge 103. The rearward extension of the lever extends adjacent the outside of the brake control of switch assembly 77. Mounted on the frame 83 the inclined edge of the lever is a manually movable brake release member comprising a downwardly projected finger 104 pivoted to the frame for movement about a transverse axis of pivot projections 106. Extended in an opposite direction from finger 104 is an arm 107, shown in FIG. 2, which functions as a main control arm for finger 104. As shown in FIG. 8, when finger 104 is moved in a forward direction the forward portion 101 of lever 96 is moved toward pulley 63 forcing rod 87 in a direction of arrow 105 to release both brakes 78 and 79. Finger 104 rests on the straight edge 103 to hold the brakes 78 and 79 in their released positions thereby enabling an operator to manually move the film reels. The pressure of springs 88 and 88A force the lever into engagement with the finger 104 whereby the friction between the finger and the straight edge 103 prevents the finger from moving to its released position. On release of the pressure of lever 96 on finger 104, the finger will move under the influence of a light spring 108 to the release position, shown in FIG. 4.

A roller 109 rotatably mounted on the rear end of lever 96 engages a noncircular cam 111 having a flat side 112. Cam 111 mounted on the control shaft 113 of switch assembly 77 operates in conjunction with the switch to release the brake 78 and 79 and permit the springs 88 and 88A to apply the brakes 78 and 79 when the switch is in the off position.

The combination switch and brake control 77, shown in FIG. 9, comprises a variable resistance switch unit indicated generally at 114 having a first resistance coil 116 and a second resistance coil 118 connected to the lines 119 and 121 respectively. A common contact 118 operatively connected to the shaft 113 rotates with the cam 111. Contact 118 selectively engages the ends of the coils 116 and 117 to affect a switching action to connect one of the motors 67 or 68 to the source of electrical power. Contact 118 is in the off position between the coils when the flat side 112 of cam 111 is adjacent roller 109 so that the brake will automatically and immediately be applied when the power to the motor is cut off. This prevents free rotation of the reels 17 and 18. A knob 122 secured to the upper end of shaft 113 is used to facilitate the concurrent operation of the switch with the brake control.

In use, referring to FIG. 6 when the flat side 112 is adjacent the roller 109, the switch is in the off position and the brakes 78 and 79 are in the applied positions. The brakes may be released without operating the motors by movement of the arm 107 forcing the finger in a rearward direction, as shown in Fig. 8, thereby moving the lever and rod 87 to a brake release position. The roller 109 moves away from the cam 111 and still remains a short distance within the circumferential arc of the circular portion of the cam. When the switch is turned to an on position, either to the left or to the right, the cam will engage the roller 109 rotating the lever 96 a slight distance to the brake release position. This releases the holding action established by the friction between the edge 103 and finger 104. With the force on the finger 104 release spring 108 returns the finger 104 to the brake release position. This automatically prevents the brakes 78 and 79 from being held in the release position when the switch is turned off. As soon as the switch is turned off the flat portion 112 of the cam aligns with the roller 109 thereby releasing the force on lever 96. Both springs 88 and 88A force the levers to the brake applied positions. The collars 91 and 91A being spaced slightly from the levers 82 and 82A when the brakes are in the applied positions do not interfere with the action of the springs 88 and 88A in applying the brakes.

While the invention has been described and illustrated with reference to a preferred embodiment, it is understood that various substitutions and changes in form may be made by by those skilled in the art without departing from the spirit of the invention.

I claim:

1. A brake comprising: a stationary member, first rotatable means, first arm means pivotally mounted on the stationary member for movement toward and away from the first rotatable means, said first arm means having means engageable with the first rotatable means for braking said first rotatable means, second rotatable means, second arm means pivotally mounted on the stationary member for movement toward and away from the second rotatable means, said second arm means having means engageable with the second rotatable means for braking said second rotatable means, a single rod engageable with the first arm means and the second arm means and movably mounted for linear movement on the stationary member, means for biasing the first and second arm means toward their adjacent rotatable means, and release means for concurrently moving the first and second arm means away from their adjacent rotatable means, said release means including a lever pivotally mounted in the stationary member, means pivotally connecting the lever with the rod, first means having a portion movable to a first position to engage one end of the lever for moving the lever in the direction to move the rod in a brake release direction whereby the first and second arm means move away from their adjacent rotatable means to brake release positions said portion of the first means also movable to a second position, and second means having a portion movable to a position to engage the other end of the lever for moving the lever in a direction to move the rod in a brake release direction whereby the first and second arm means move away from the rotatable means to brake release positions, said portion of the second means when in engagement with the lever holding the lever in a position spaced from the portion of the first means located in its first position, means separate from the second means to move the portion of the first means from its first position to its second position thereby rendering the first means inoperative when the second means holds the first and second arm means in brake release positions.

2. The brake of claim 1 wherein said rotatable means comprises driven cylindrical members.

3. The brake of claim 1 wherein said first means comprises a finger pivotally mounted on the stationary member and engageable with said one end of the lever for moving the lever toward the arm means, said finger movable to a position to hold the lever and first and second arm means in brake release positions.

4. The brake of claim 1 wherein the means for biasing the first arm means and second arm means comprise spring means movably mounted on the rod.

5. The brake of claim 1 wherein said second means comprises a cam engageable with the other end of the lever for moving the lever toward the arm means to the brake release position, said cam having a first portion allowing the first and second arm means and the lever to be biased by the biasing means to braking positions and a second portion engageable with said other end of the lever to move the first and second arm means to brake release positions.

6. The brake of claim 5 wherein said second portion of the cam moves the lever to a position to allow the first means to disengage the lever.

7. A brake comprising: a stationary member, rotatable means, arm means movably mounted on the stationary member for movement toward and away from the rotatable means, said arm means having braking means engageable with the rotatable means for braking said rotatable means, biasing means for moving the arm means toward the rotatable means, to engage the braking means with the rotatable means and release means for moving the arm means against the biasing means away from the rotatable means, said release means including a single rod movably mounted for linear movement along the longitudinal axis of the rod on the stationary member, means on the rod engageable with the arm means for moving the arm means with the rod against the biasing means, a lever, means pivotally connecting a midportion of the lever to the stationary member, said rod being pivotally connected to the lever at a point spaced from the pivotal connection to the stationary member, first means having a portion movable to a first position to engage one end of the lever to move the lever in a direction to move the rod carrying the arm means to a brake release position, said portion of the first means also movable to a second position and second means having a portion movable to a position to engage the other end of the lever to move the lever in the same direction to move the rod carrying the arm means to a brake release position, said portion of the second means when in engagement with the lever holding the lever in a position spaced from the portion of the first means located in its first position, means separate from the second means to move the portion of the first means from its first position to its second position thereby rendering the first means inoperative when the second means holds the arm means in the brake release position.

8. The brake of claim 7 wherein said second means includes a cam having a first portion allowing the arm means and the lever to be moved to a brake position and a second portion engageable with the lever to move the arm means to said brake release position, said second portion of the cam moving the lever to the position allowing the first means to disengage the lever.

9. The brake of claim 7 wherein the biasing means comprise spring means carried by the rod and engageable with the arm means.

10. The brake of claim 9 wherein said first means comprises a finger pivotally mounted on a stationary member and engageable with said one end of the lever for moving the lever toward the arm means, said finger movable to a position to hold the lever and the arm means in a brake release position.

11. The brake of claim 9 wherein the second means comprises a cam engageable with said other end of the lever for moving the lever toward the arm means to a brake release position, said cam having a first portion allowing the arm means and the lever to be moved to a braking position, and a second portion engageable with said other end of the lever to move the arm means to said brake release position.

* * * * *